United States Patent
Mizuno et al.

(10) Patent No.: US 8,268,509 B2
(45) Date of Patent: Sep. 18, 2012

(54) HYDROGEN-PERMEABLE STRUCTURE, METHOD OF MANUFACTURING THEREOF AND FUEL CELL USING THE SAME

(75) Inventors: Osamu Mizuno, Itami (JP); Ryoko Kanda, Itami (JP); Jin-Joo Park, Itami (JP); Satoshi Aoyama, Susono (JP); Naoki Ito, Yokohama (JP)

(73) Assignees: Sumitomo Electric Industries, Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 999 days.

(21) Appl. No.: 12/007,802

(22) Filed: Jan. 15, 2008

(65) Prior Publication Data

US 2010/0285393 A1  Nov. 11, 2010

(30) Foreign Application Priority Data

Jan. 15, 2007  (JP) .................. 2007-006168

(51) Int. Cl.
*H01M 8/00* (2006.01)
*H01M 8/10* (2006.01)

(52) U.S. Cl. ......... 429/535; 429/491; 429/495; 427/115

(58) Field of Classification Search .................. 429/495, 429/491, 479, 535, 483; 427/115
See application file for complete search history.

(56) References Cited

U.S. PATENT DOCUMENTS

2002/0031695 A1* 3/2002 Smotkin ................. 429/30
2003/0211948 A1* 11/2003 Paranthaman et al. ....... 505/237

FOREIGN PATENT DOCUMENTS

| JP | 2004-188347 A | 7/2004 |
| JP | 2005-166531 A | 6/2005 |
| JP | 2005-302420 A | 10/2005 |
| JP | 2005-339815 A | 12/2005 |

OTHER PUBLICATIONS

Yamaguchi, et al., "Construction of fuel cells based on this proton conducting oxide electrolyte and hydrogen-permeabel metal membrane electrode," Solid State Ionics, Elsevier, Aug. 30, 2002.
Yamaguchi, S., et al., "Construction of fuel cells based on thin proton conducting oxide electrolyte and hydrogen-permeable metal membrane electrode", Solid State Ionics, Sep. 2003, pp. 291-296, vol. 162-163, Elsevier.
Japanese Notice of Grounds of Rejection, w/English translation thereof, issued in Japanese Patent Application No. JP 2007-006168.

* cited by examiner

*Primary Examiner* — Raymond Alejandro
(74) *Attorney, Agent, or Firm* — McDermott Will & Emery LLP

(57) ABSTRACT

A hydrogen-permeable structure is disclosed, which includes a hydrogen-permeable base in which a fluctuation range of a d value by X-ray analysis measurement is at most 0.05% in a region within 2 μm deep from a surface, and an oxide proton conductive film formed on a surface thereof. The disclosure also relates to a method of manufacturing the hydrogen-permeable structure and a fuel cell using the hydrogen-permeable structure.

4 Claims, 1 Drawing Sheet

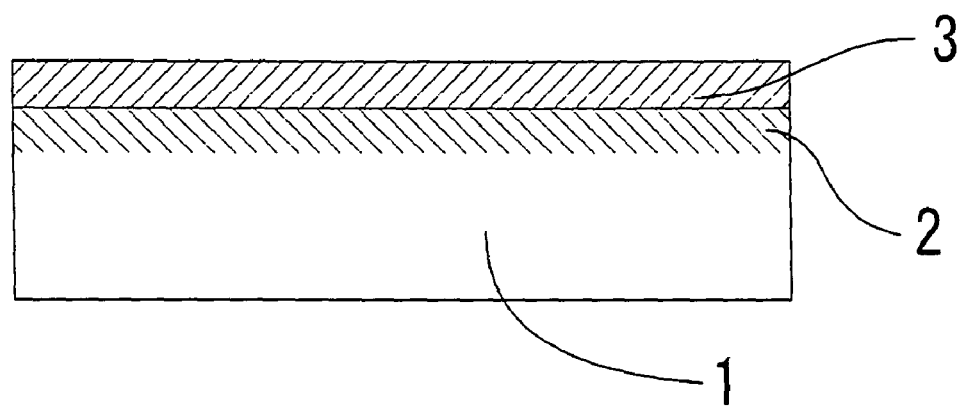

HYDROGEN-PERMEABLE STRUCTURE, METHOD OF MANUFACTURING THEREOF AND FUEL CELL USING THE SAME

BACKGROUND OF THE INVENTION

1. Field of the Invention

The present invention relates to a hydrogen-permeable structure including a metal base having hydrogen permeability (hereinafter, referred to as "hydrogen-permeable base") and an oxide proton conductive film, a manufacturing method thereof, and a fuel cell using the hydrogen-permeable structure.

2. Description of the Background Art

A hydrogen-permeable structure in which a proton-conductive solid electrolyte film is formed on a hydrogen-permeable base has a function of selectively detecting and separating hydrogen and a function of outputting electric energy, and is used in a hydrogen sensor, a fuel cell (hydrogen fuel cell), and the like.

Such a hydrogen-permeable structure is described, for example, in SOLID STATE IONICS, 162-163 (2003), pp. 291-296, and in this document, palladium (Pd) or palladium-containing metal (Pd alloy) is disclosed as a material of the hydrogen-permeable base. As a material of the proton-conductive solid electrolyte film, oxides containing alkaline earth metal and cerium (Ce) or the like are disclosed.

Here, as an oxide that forms a solid electrolyte film, a composite oxide having a basic composition represented by a general formula of $ALO_3$ (in which A represents alkaline earth metal and L represents tetravalent element such as Ce, titanium (Ti), zirconium (Zr) and the like) and having a perovskite-type crystal structure (hereinafter, referred to as "perovskite structure oxide") can be preferably recited because it has excellent heat resistance. Among these, a variety of perovskite structure oxides having such a composition that tetravalent elements L are partially substituted by trivalent elements M are proposed because they have excellent proton conductivity.

Also it is demanded to reduce film thickness of a solid electrolyte film in order to realize excellent proton conductivity. Such a hydrogen-permeable structure may be obtained by forming a proton conductive thin film on a hydrogen-permeable base made of, for example, Pd or Pd alloy, by vapor-deposition of material elements constituting the perovskite structure oxide by sputtering method, laser ablation method (pulse laser deposition method or PLD method) and the like.

In forming a solid electrolyte film, namely, a proton conductive thin film (hereinafter, referred to as "proton conductive film") by the method as described above, if the surface of the hydrogen-permeable base has roughness, defects are likely to occur in the proton conductive film. Therefore it is demanded to remove roughness occurring on the surface of the hydrogen-permeable base. In particular, when the hydrogen-permeable base is Pd foil or Pd alloy foil, rolling, surface grinding or the like for removal of roughness is conducted because such foil is soft and roughness is more like to occur on the surface thereof.

SUMMARY OF THE INVENTION

However, when rolling or surface grinding is conducted on the hydrogen-permeable base, a problem arises that the proton conductive film is more liable to peel off. The present inventor found the problem that residual stress such as compression or tension remains due to rolling or surface grinding, and a distortion layer spanning several micrometers remains in the surface layer thereof, and when the proton conductive film is formed on the distortion layer, the film is more likely to peel off.

That is, the residual stress in the distortion layer is released at temperature at the time of film formation, or in a temperature region where proton conduction appears at the time of using a fuel cell, so that a shear arises between the hydrogen-permeable base and the proton conductive film. This makes the proton conductive film be more liable to peel off. When peeling occurs, stable performance is no longer maintained because of deterioration in proton conductivity.

In light of this, it is an object of the present invention to provide a hydrogen-permeable structure solving the above problem associated with the conventional art, wherein peel-off between a hydrogen-permeable base and a proton conductive film is difficult to occur, stable performance is kept for a long time, and excellent durability is realized.

It is a further object of the present invention to provide a manufacturing method of the hydrogen-permeable structure, and a fuel cell having excellent durability using the hydrogen-permeable structure.

In order to solve the above problem, the present invention provides a hydrogen-permeable structure including a hydrogen-permeable base and an oxide proton conductive film formed in close contact with one face of the hydrogen-permeable base, wherein the hydrogen-permeable base has a fluctuation range of a d value by X-ray analysis measurement of at most 0.05% in a region within 2 μm deep from a surface on the face where the oxide proton conductive film is formed.

As a hydrogen-permeable base, those formed of a metal film having hydrogen permeability (hydrogen-permeable metal film), and those obtained by forming a hydrogen-permeable metal film on the surface of a metal porous base can be exemplified. Here, as the hydrogen-permeable metal film, Pd foil, foil of Pd alloy containing silver (Ag), platinum (Pt), copper (Cu) or the like insofar as hydrogen permeability is impaired, namely, Pd containing metal foil can be exemplified.

Also those obtained by covering the surface of foil of Group V elements, i.e., vanadium (V), niobium (Nb) or tantalum (Ta) with Pd or Pd, or those obtained by covering the surface of foil of alloy of V, Ta or Nb with Pd or Pd alloy, or in other words, those obtained by forming Pd containing foil on the surface of metal foil containing either one selected from V, Nb and Ta may be used. As an alloy of V, Ta or Nb, alloys with nickel (Ni), Ti, cobalt (Co), chromium (Cr) and the like can be exemplified.

For improving the hydrogen permeability, it is preferably that the hydrogen-permeable metal film has smaller thickness. However, since a supporting ability of keeping structure of the oxide proton conductive film to be formed thereon is requested, the thickness is preferably at least 20 μm and less than 1 mm when a metal porous base or the like is not used. Thickness of less than 20 μm may result in breakage due to insufficient strength. On the other hand, when the thickness is larger than 1 mm, hydrogen permeation amount is reduced, so that sufficient proton conduction may not be realized due to rate-limiting by the amount of hydrogen permeating the base.

When those obtained by covering the surface of foil of Group V element such as V, with foil of Pd or Pd alloy are used, use amount of Pd which is expensive can be saved, and, in this case, preferred thickness of foil of Pd or Pd alloy is usually about 0.05 to 2 μm. By the thickness of 0.05 μm or less, it is impossible to adequately cover the base of V or the like, so that V or the like may possibly be oxidized and deteriorated. When the thickness exceeds 2 µm, there is a problem that use amount of Pd which is expensive increases and the cost rises.

As described above, as the hydrogen-permeable base, those obtained by forming a hydrogen-permeable metal film on a metal porous base may also be used as well as those formed only of a hydrogen-permeable metal film. As the metal porous base used herein, conductive metal having pores allowing permission of hydrogen, and porous base formed of SUS or the like can be exemplified. As a method of forming a hydrogen-permeable metal film on the surface of a metal porous base, methods of overlaying metal that forms a hydrogen-permeable metal film on the surface of a metal porous base by sputtering, electron beam vapor deposition, or a PLD method can be exemplified. A method based on wet process such as plating method is also applicable.

The hydrogen-permeable structure of the present invention is featured in that the hydrogen-permeable base constituting the same has no distortion layer on the face where the oxide proton conductive film thereof is formed, or concretely, the fluctuation range of the d value by X-ray analysis measurement is at most 0.05% (satisfies central value j=±0.05%) in a region within 2 µm deep from a surface on the face where the oxide proton conductive film is formed. With this feature, it is possible to obtain a hydrogen-permeable structure having improved adherence and excellent durability, in which peel-off of the oxide proton conductive film is suppressed.

Presence/absence and thickness of distortion may be measured by the variation (fluctuation range) of the d value (distance between crystal planes) obtained by X-ray analysis (XRD). That is, the d value is substantially constant in the layer having no distortion, however, when there is some distortion, the d value will vary depending on the position. Based on this fact, degree of distortion in the depth direction from the surface can be determined by measuring the d value by analysis of X-ray spectrum obtained by varying incident angle of X-ray with respect to the surface of the base, and examining the fluctuation range of the d values. Examination made by the present inventor demonstrated that in the case of Pd foil which is ground under a condition generally employed in this filed of art, the d values are small and variable in a region up to nearly 1 µm deep from a Pd surface layer, indicating presence of distortion, whereas the d values tend to be constant in a region of depth exceeding 1 µm, indicating reduced distortion.

The oxide proton conductive film is a film of solid electrolyte made of a compound containing metal and oxygen, and propagates protons ($H^+$, proton) therethrough.

As an oxide proton conductive film, those formed of oxide having a perovskite structure represented by a chemical formula $AL_{1-x}M_xO_{3-\alpha}$ (in which A represents alkaline earth metal, L represents at least one kind of element selected from Zr, Ce, Ti and hafnium (Hf), M represents at least one kind of element selected from trivalent elements, x is more than 0 and at most 0.2, and α is at least 0.3 and at most 0.95) are preferred because excellent proton conductivity is realized.

In the above chemical formula $AL_{1-x}M_xO_{3-\alpha}$, as the alkaline earth metal represented by A, one kind or at least two kinds selected from barium (Ba), magnesium (Mg), calcium (Ca), and strontium (Sr) is preferred.

M is a trivalent element, and proton conductivity appears when part of tetravalent element L is substituted by M. M is selected from the group consisting of neodymium (Nd), gallium (Ga), aluminum (Al), yttrium (Y), indium (In), ytterbium (Yb), scandium (Sc), gadolinium (Gd), samarium (Sm), and praseodymium (Pr), and at least one element is appropriately selected based on the kinds of elements of A and L. By appropriately selecting A, L and M in the formula, from those exemplified as particularly preferred ones, it is possible to realize both high proton conductivity and electron insulation.

The character x represents substitution rate of M relative to L, and is more than 0 but at most 0.2. When it exceeds 0.2, the perovskite structure of the oxide is unstable, so that stability to water dramatically decreases.

The character α denotes an index representing degree of oxygen deficiency in the perovskite structure oxide, and falls within the range of 0.3 to 0.95. Since α is not equal to 0, the perovskite structure oxide is an oxygen-deficient-form perovskite structure oxide.

Thickness of the oxide proton conductive film is preferably from 0.02 µm to 2 µm. When the thickness is less than 0.02 µm, defect such as pin hole is likely to occur in the membrane. If there is a pin hole or the like, hydrogen gas passes through the film without being protonated, so that electric current will not be outputted. When the thickness is more than 2 µm, proton penetration resistance is large, and proton conductivity decreases, so that output of electric current decreases.

The hydrogen-permeable structure of the present invention may readily be manufactured by a method that includes the steps of removing distortion for removing a distortion layer on one face of the hydrogen-permeable base so that the fluctuation range of the d value by X-ray analysis measurement is at most 0.05% in a region within 2 µm deep from the surface; and forming an oxide proton conductive film on the one face from which the distortion layer is removed. The present invention also provides a method of manufacturing the hydrogen-permeable structure.

The distortion removing step is a step of removing a layer having distortion (distortion layer) occurring, for example, by rolling or surface grinding, such as removal of roughness of the surface, from the face where an oxide proton conductive film is to be formed, of the hydrogen-permeable base. The way of removing is not limited to a specific method, and a variety of methods including Ar ion milling, electropolishing, and annealing may be employed. When the hydrogen-permeable metal film is obtained by covering the surface of foil of Group V element such as V with foil of Pd or Pd alloy, and thickness of the foil of Pd or Pd alloy is about 0.05 to 2 µm, such a method can be employed that after removing roughness of the surface of the foil of Group V element such as V by rolling or surface grinding, an occurring distortion layer is removed in the manner as described above, and then foil of Pd or Pd alloy is formed thereon.

On the one face of the hydrogen-permeable base in which the distortion layer is removed in the manner as described above, an oxide proton conductive film is formed (film forming step). As described above, as the oxide proton conductive film, the one that is formed of perovskite structure oxide is preferred. As to formation of the oxide proton conductive film having a perovskite structure, known means that are used for formation of a proton conductive film, including ion plating method, PLD method (laser ablation method), physical vapor deposition (PVD method), sputtering method, chemical vapor deposition (CVD method), metalorganic chemical vapor deposition (MOCVD method) may be used. Also, wet method of sol-gel method may be used without limited to any specific means.

In order to obtain the oxide proton conductive film having a perovskite structure, it is preferred to form the film at a temperature of at least 500° C., in oxidative atmosphere. Alternatively, a perovskite structure may be obtained by burning at a temperature of at least 500° C., in oxidative atmosphere after film formation. Consideration the heat resistance of the hydrogen-permeable base, film formation temperature and burning temperature are preferably at most 650° C.

The hydrogen-permeable structure thus obtained has excellent durability, so that it is desirably used as various members of hydrogen device, particularly as a member of fuel cell which is expected as an earth-conscious clean energy supply source, by being combined with a functional member such as an electrode.

The present invention also provides a fuel cell featured by using the hydrogen-permeable structure.

The fuel cell usually has such a structure that an oxygen electrode (cathode electrode; a hydrogen-permeable base functions as an anode electrode) is provided on an oxide proton conductive film constituting the hydrogen-permeable structure, and the oxide proton conductive film is sandwiched between the hydrogen-permeable base and the oxygen electrode. As the oxygen electrode, a thin-film electrode made of Pd, Pt, Ni, ruthenium (Ru) or alloy thereof, a thick-film electrode made of noble metal or oxide conductor, and a porous electrode of porous material containing noble metal or oxide conductor can be preferably exemplified. A thin-film oxygen electrode may be obtained by forming film of Pd, Pt, Ni, Ru or alloy thereof on the proton conductive film by the sputtering method, electron beam vapor deposition method, PLD method and the like. Usually, the thickness is about 0.01 to 10 µm, and preferably about 0.03 to 0.3 µm.

A thick-film oxygen electrode may be formed by applying, for example, Pt paste, Pd paste, oxide conductor paste or the like, on the proton conductive film, followed by burning. The electrode thus formed becomes generally a porous electrode. As an oxide conductor, for example, lanthanum (La)—Sr—Co-based, La—Sr-iron (Fe)-based and Sr—Pr—Co-based composite oxides can be exemplified. Thickness of the applied layer is usually about 5 to 500 µm.

In using this fuel cell, hydrogen contacting on the side of the hydrogen-permeable base of the hydrogen-permeable structure permeates the hydrogen-permeable base to reach the proton conductive film where it releases electron to become a proton. This proton permeates the proton conductive film to reach the side of oxygen electrode where it Obtains electron and binds with oxygen which is present on the oxygen electrode side to generate water which is released outside the system. Donation/reception of electron at the base side and the oxygen electrode side causes generation of electromotive force, and provides the function as a buttery.

In contrast to a conventional fuel cell having a problem of peel-off between the hydrogen-permeable base and the proton conductive film, the fuel cell of the present invention alleviates the problem of peel-off and realizes excellent durability. In the hydrogen-permeable structure of the present invention including a hydrogen-permeable base and a proton conductive film, peel-off between the hydrogen-permeable base and the proton conductive film is suppressed, and stable performance and excellent durability are realized. The hydrogen-permeable structure may be readily obtained by the method of manufacturing a hydrogen-permeable structure according to the present invention. The fuel cell of the present invention using the hydrogen-permeable structure is a fuel cell having excellent durability and ability of exerting stable performance for a long time.

The foregoing and other objects, features, aspects and advantages of the present invention will become more apparent from the following detailed description of the present invention when taken in conjunction with the accompanying drawing.

BRIEF DESCRIPTION OF THE DRAWINGS

FIG. 1 is a schematic section view schematically showing a hydrogen-permeable structure of the present invention.

DESCRIPTION OF THE PREFERRED EMBODIMENTS

In the following, the present invention will be described based on preferred embodiments for carrying out the present invention. The present invention is not limited to the following embodiments. Various changes may be added to the following embodiments within the scope equivalent to that of the present invention.

FIG. 1 is a schematic section view schematically showing a hydrogen-permeable structure of the present invention. In the drawing, a hydrogen-permeable structure includes a hydrogen-permeable base 1 and a proton conductive film 3, wherein proton conductive film 3 is formed on one face of hydrogen-permeable base 1. A region 2 in the drawing is within 2 µm deep from the surface on the side of proton conductive film 3 of hydrogen-permeable base 1. In this region, a fluctuation range of a d value by X-ray analysis measurement is at most 0.05%. That is, hydrogen-permeable base 1 has no distortion layer.

In the following, more concrete description will be made by way of examples, however, the scope of the present invention is not limited to these examples.

EXAMPLES

Example 1

Distortion Removing Step

The fluctuation range of the d value in the region within 2 µm deep from the surface of Pd foil (base) of 0.1 µm thick, in which roughness of the surface was removed by surface grinding, was measured in advance. Measurement was executed by using an X-ray analyzer (RINT: product of Rigaku Corporation.) (incident angle: 40.1°). Next, the Pd foil was subjected to Ar ion milling process as a distortion removing step, and after the process, the fluctuation range of the d value was measured in a similar manner.

Ar ion milling process was conducted in the following steps.
(1) Introduce 25 sccm of argon (Ar) gas into an atmosphere of degree of vacuum of at most $1 \times 10^{-2}$ Pa.
(2) Apply electric field by high frequency wave of 13.56 MHz to cause ionization of Ar.
(3) Apply minus voltage of 1 kV to the Pd foil to make Ar ions collide with the base.
(4) Allow collision of Ar ions for about 1 hour to remove the surface layer of 1 µm.
[Manufacture of Hydrogen-Permeable Structure]

On the surface of the hydrogen-permeable base after the process, an oxide proton conductive film (perovskite structure) having a film thickness of 1 µm and a composition of $SrZr_{0.8}Yb_{0.2}O_3$, was formed by a PLD method to obtain a hydrogen-permeable structure of Example 1.

Here, the PLD method was executed in the following steps.
(1) Set a hydrogen-permeable base in a holder inside a vacuum chamber having synthetic quartz glass window for laser transmission, and heat the holder to 550° C.
(2) Introduce oxygen via a mass flow meter, and adjust the internal pressure of the chamber to a partial pressure of oxygen of $1 \times 10^{-2}$ Torr.
(3) Irradiate material sintered body of oxide proton conductive film (20 mmϕ, 5 mm thick) with KrF excimer laser (frequency 20 Hz) through the window for laser irradiation.

Example 2

A hydrogen-permeable structure of Example 2 was obtained in a similar manner as Example 1, except that composition of the perovskite structure oxide was changed to $BrZr_{0.8}Y_{0.2}O_{3-\alpha}$.

Example 3

A hydrogen-permeable structure of Example 3 was obtained in a similar manner as Example 1, except that the distortion removing step was conducted by annealing process. Annealing process was achieved by leaving the base still in an atmosphere of degree of vacuum of at most $1\times10^{-2}$ Pa and about 700° C. for at least two hours.

Example 4

A hydrogen-permeable structure of Example 4 was obtained in a similar manner as Example 1, except that Pd—Ag alloy foil was used as the base in place of Pd foil.

Example 5

A hydrogen-permeable structure of Example 5 was obtained in a similar manner as Example 1, except that the base was replaced by the one that was manufactured by forming a Pd film of 0.1 μm thick on V foil having 0.1 mm thick in which roughness of the surface was removed by surface grinding, after measurement of the fluctuation range of the d value and Ar ion milling process likewise the case of Example 1.

Comparative Example 1

A hydrogen-permeable structure of Comparative example 1 was obtained in a similar manner as Example 1 except that Ar ion milling process, and distortion removing step by annealing process were not conducted.

(Physical Property Test)

On a proton conductive film of each hydrogen-permeable structure (test piece) obtained in Examples 1 to 5 and Comparative example 1, an electrode of powder Pt of 0.1 μm in diameter was formed by screen printing, and power generation test at a constant voltage of 0.7V was conducted at 450° C. for 1000 hours while hydrogen gas was caused to flow on the side of the hydrogen-permeable base and moisturized air was caused to flow on the side of proton conductive film and oxygen electrode. Current density was measured before and after the test, and chronological reduction percentage of current density was calculated. Also peel-off state of the proton conductive film after the test was observed. Measurement result is shown in Table 1 together with the fluctuation range of the d value before and after the distortion removing step.

observed after a lapse of 1000 hours, and reduction percentage of current density was 93%. This indicates that there is some problem in terms of durability.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing a hydrogen-permeable structure including: a hydrogen-permeable base; and an oxide proton conductive film formed in close contact with one face of the hydrogen-permeable base, the method comprising the steps of:
    removing distortion for removing a distortion layer on the one face of the hydrogen-permeable base so that a fluctuation range of a d value by X-ray analysis measurement is at most 0.05% in a region within 2 μm deep from a surface thereof; and
    forming an oxide proton conductive film on said one face from which the distortion layer is removed,
    wherein the distortion layer is formed by rolling or surface grinding, and is removed by Ar ion milling, electropolishing, or annealing.

2. A hydrogen-permeable structure manufactured by the method of claim 1, comprising: a hydrogen-permeable base; and an oxide proton conductive film formed in close contact with one face of the hydrogen-permeable base, wherein
    said hydrogen-permeable base has a fluctuation range of a d value by X-ray analysis measurement of at most 0.05% in a region within 2 μm deep from a surface on the face where the oxide proton conductive film is formed.

3. The hydrogen-permeable structure according to claim 2, wherein said oxide proton conductive film is made of an oxide represented by a chemical formula $AL_{1-x}M_xO_{3-\alpha}$, in which:
    A represents alkaline earth metal,
    L represents at least one kind of element selected from zirconium, cerium, titanium and hafnium,

TABLE 1

| Sample No. | Fluctuation range of d value (%) Before distortion removal | Fluctuation range of d value (%) After distortion removal | Current density (A/cm²) Initial | Current density (A/cm²) 1000 hours | Reduction percentage (%) | Presence of peel-off |
|---|---|---|---|---|---|---|
| Example 1 | 0.080 | 0.020 | 0.25 | 0.25 | 0 | None |
| Example 2 | 0.080 | 0.020 | 0.30 | 0.30 | 0 | None |
| Example 3 | 0.080 | 0.030 | 0.25 | 0.24 | 4 | None |
| Example 4 | 0.090 | 0.020 | 0.30 | 0.30 | 0 | None |
| Example 5 | 0.100 | 0.030 | 0.40 | 0.38 | 5 | None |
| Comparative example 1 | 0.080 | 0.080 | 0.15 | 0.01 | 93 | Present |

As is apparent from Table 1, in Examples 1 to 5 in which the fluctuation range of the d value was adjusted to at most 0.05% by Ar ion milling process or annealing process (distortion removing step), reduction in current density was not observed even after a lapse of 1000 hours, which is evidence for excellent durability. In contrast to this, in Comparative example 1 in which a distortion removing step were not conducted, breakage and peel-off of the proton conductive film was M represents at least one kind of element selected from trivalent elements,
x is more than 0 and at most 0.2, and
α is at least 0.3 and at most 0.95, and
having a perovskite structure.

4. A fuel cell comprising the hydrogen-permeable structure according to claim 2.

* * * * *